Figure 1:
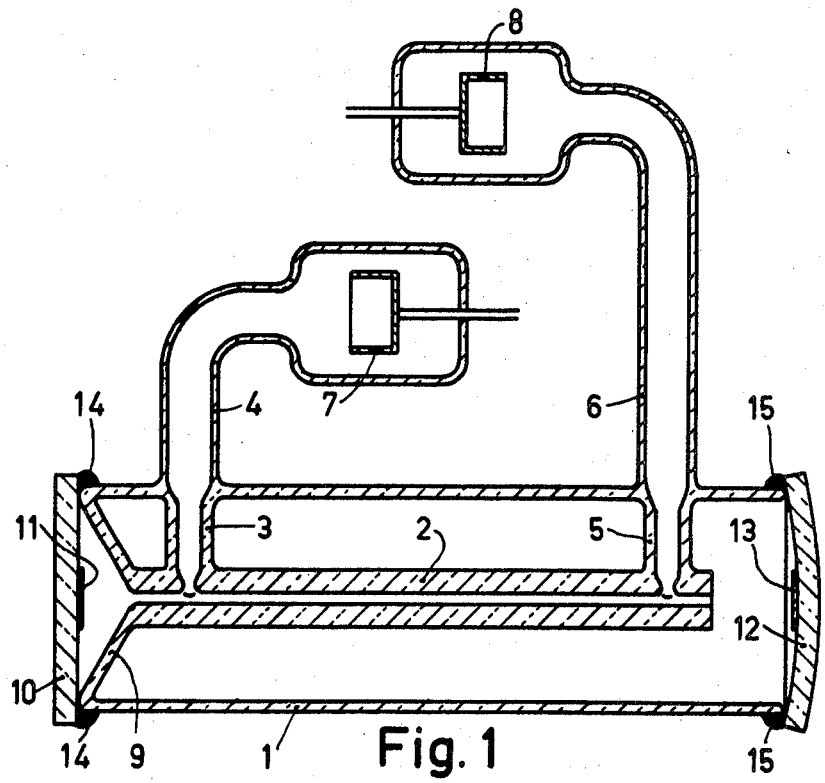

United States Patent
Bouhuis et al.

[11] 3,735,281
[45] May 22, 1973

[54] GAS DISCHARGE LASER

[75] Inventors: Gijsbertus Bouhuis; Petrus Franciscus Antonius Haans; Theodorus Hendrikus Peek, all of Emmasingel, Eindhoven, Netherlands

[73] Assignee: U.S. Philips Corporation, New York, N.Y.

[22] Filed: May 19, 1972

[21] Appl. No.: 254,886

[30] Foreign Application Priority Data

May 26, 1971 Netherlands.......................7107210

[52] U.S. Cl.................................................331/94.5
[51] Int. Cl..................................................H01s 3/08
[58] Field of Search.....................................331/94.5

[56] References Cited

UNITED STATES PATENTS

| 3,566,302 | 2/1971 | Rhodes | 331/94.5 |
| 3,477,036 | 11/1969 | Haisma | 331/94.5 |

Primary Examiner—William L. Sikes
Attorney—Frank R. Trifari

[57] ABSTRACT

A laser having a wavelength of 6,328 A is constructed from a quartz capillary which is connected by side tubes to a supporting outer tube and electrode spaces. Double conical edges are ground on the outer tube, the line of intersection of which constitutes the support for the reflector plate. The laser is of the nearly hemispherical type and single mode.

5 Claims, 5 Drawing Figures

Patented May 22, 1973 3,735,281

2 Sheets-Sheet 1

GAS DISCHARGE LASER

The invention relates to a gas discharge laser in which the discharge occurs in a helium-neon mixture in a narrow duct inside a quartz body, which duct is connected, near the ends, to electrode spaces outside the quartz body by ducts inside the quartz body extending transverse to said duct, the reflector plates being supported directly by the quartz body.

A laser of such a construction is known from "Physics Letters 2 (No. 7), 340–341, 1962" and from the thesis by J.Haisma: Construction and properties of short stable gas lasers, chapter 2 (Utrecht 1966).

The quartz body consists of a solid cylinder, 12 cm long, and 3.5 cm in diameter. Along the axis of the cylinder a duct of 3 mm in diameter is drilled and fashioned with connection ducts at right angles thereto. The flat reflector plates are disposed upon the ends of the cylinder, and are ground flat and parallel to each other.

Although the known laser has led to interesting applications in metrology, and has contributed to the study of lasers in general, it exhibits a number of drawbacks. The use for measurements on an industrial scale, therefore is not presently possible. The flat mirrors impose very stringent requirements upon the mutual parallelism of the end faces, namely better than 1 to 4 seconds of arc, and upon the flatness of said end faces and the reflector plates (flatness requirement approximately 0.02 $\mu$). Consequently, the grinding and polishing operation is time-consuming and expensive. The comparatively wide gas discharge duct which can be used at the wavelength of 1.153 $\mu$ however, cannot operate at a wavelength of 0.6328 $\mu$ in connection with low amplification. Drilling narrower holes in the quartz block is very difficult and expensive.

It is the object of the invention to provide a simpler laser construction.

According to the invention, a gas discharge laser is provided in which the discharge occurs in a helium-neon mixture. A narrow duct is disposed inside a quartz body. The duct is connected, near its ends, to electrode spaces outside the quartz body by ducts inside the quartz body extending transverse to said duct. Reflector plates are supported directly by the quartz body. The duct in which the gas discharge occurs, consists of a narrow quartz tube, which is supported coaxially within a slightly longer quartz tube by side tubes which are attached to both tubes. A screen connects one of the ends of the inner tube to the adjacent end of the outer tube. The reflector plates are supported by the ends of the outer tube.

The construction according to the invention avoids the use of a solid body in which drilling operations have to be carried out, and enables the use of standard material for the inner and the outer tube. The side tubes enable a gradual variation of the discharge track from the electrode spaces to the inner tube, which usually will have to have a small inner diameter in connection with the amplification at the desirable wavelength of 0.6328 $\mu$. The gradually varying cross-section is of importance in connection with the occurrence of oscillations and other sources of noise in the discharge, which would give rise to objections when used in measuring instruments.

The object of the screen is to force the discharge through the inner tube, and therefore it must be sealed between the inner and the outer tube in an entirely vacuum-tight manner.

It has also been found, that with an inner diameter of the inner tube of approximately 1 mm, no hindrance is experienced from any bending of the inner tube due to temperature differences. These temperature differences occur under the influence of the discharge between the inner and outer tube, as a result of clamping between the side tubes.

It is to be noted that in a prior Dutch Patent application 6915791, a construction is described, in which the inner tube with ground ends fits in flat screening plates fitting in ground rabbets of the outer tube. Both screening plates are secured to the outer tube, and one of them is secured to the inner tube by means of quartz enamel. The electrode spaces are connected to the outer tube between the screening plates and the ends. This construction with strongly varying cross-section of the discharge track, easily gives rise to oscillations and noise. Moreover, it is very difficult to achieve with this construction, a tight quartz enamel seal so that no discharge will occur which bypasses the inner tube. These drawbacks do not occur in the present inventive construction.

According to the invention, an assembly of a flat and a concave reflector plate, is preferably used in which the radius of curvature of the latter is slightly larger than the mutual distance. As a result of this, the laser becomes a nearly hemispherical resonator. The advantage of such a resonator is that with a capillary of approximately 1 mm inner diameter, (a) limitation to the axial mode can easily be obtained, and (b) the tolerances in the supports of the reflector plates are considerably larger than in a case of the laser having flat reflector plates as was described hereinbefore. For a laser constructed according to the invention, of approximately 15 cm in length, the tolerances in the parallelism of the supporting edges are approximately 40 seconds of arc.

The supports of the reflector plates with the outer tube are each preferably formed according to the invention, by the circular line of intersection of two oppositely directed conical surfaces, which are ground on an end of the outer tube and are centered relative to the inner tube. These surfaces enclose an obtuse angle with each other. By using, during grinding the two supports, the same centering relative to the inner tube, circular lines of intersection are automatically obtained in planes at right angles to the centering axis. These lines are parallel to each other, and centered relative to the centering axis.

In an assembly of supports using this construction and having a combination of a concave and flat mirror, the center of curvature of the former is always on the centering axis. Preferably, half the apex of each of the conical surfaces, is larger than, or equal to 60° so as to avoid sharp and crumbly supporting edges. An improvement in this respect, can be achieved by making both half apexes 60° to 75°, and grinding a third conical surface which intersects the two other surfaces, and has half an apex which is larger than or equal to 80° and which does not touch the surface of the concave mirror at that area.

The support described here is not only of importance in lasers of the type described, but may also be used in other lasers having a different wavelength, including for example, those of 10 $\mu$ and more. This construction may also be used in other optical apparatus. The support also forms the subject matter of a Patent application Ser. No. 252,485 filed separately and simultaneously herewith. For grinding the support, a simple grinding bench and good centers are sufficient. A parallelism of the supporting edges which lies within 15 seconds of arc can easily be achieved, while the deviation from the vertical position of the supporting edges relative to the axis of the inner tube is considerably less than the permissible maximum of 1½ minutes of arc.

The invention will be described in greater detail with reference to the drawing, in which FIG. 1 is an axial cross-sectional view through a laser according to the invention, and FIGS. 2, 3, 4 and 5 are cross-sectional views on an enlarged scale of a few supporting edges.

Reference numeral 1 in FIG. 1 denotes a quartz tube, 130 mm long, 35 mm diameter, and of 2 mm wall thickness. 2 denotes a quartz tube of 8 mm outer diameter, and 1 mm inner diameter. Side tubes 3, 4 and 5, 6, respectively, lead to the spaces containing the anode 7 and the cathode 8. A screen 9 connects the left-hand end of the inner tube to the left-hand end of the outer tube. All these parts are manufactured from quartz. The flat reflector plate 10, with dichroic layers 11 is sealed against the left-hand end of the tube 1. The curved reflector plate 12 with dichroic layers 13 is sealed against the right-hand end. The radius of curvature of the inside of the plate 12, is 145 mm. The dichroic layers 11 and 13 are made for a wavelength of 6,328 A. The tube 1 is filled with helium to which 15 percent neon ($Ne^{20}$) has been added. The mixture has a pressure of 3 Torr. Cementing edges 14 and 15 ensure the vacuum tightness of the quartz plates 10 and 12 to the tube 1. The laser produces one single axial mode, with which the supplied power is 0.5 mW. The laser described herein is suitable as a Zeeman laser, that is to say, that in an axial magnetic field, the axial mode is divided into two oppositely rotating circularly polarized components of different optical frequency. These two components may be used, on the one hand, to stabilize the average frequency, and on the other hand, are of great importance when used in metrology.

Figure 2:
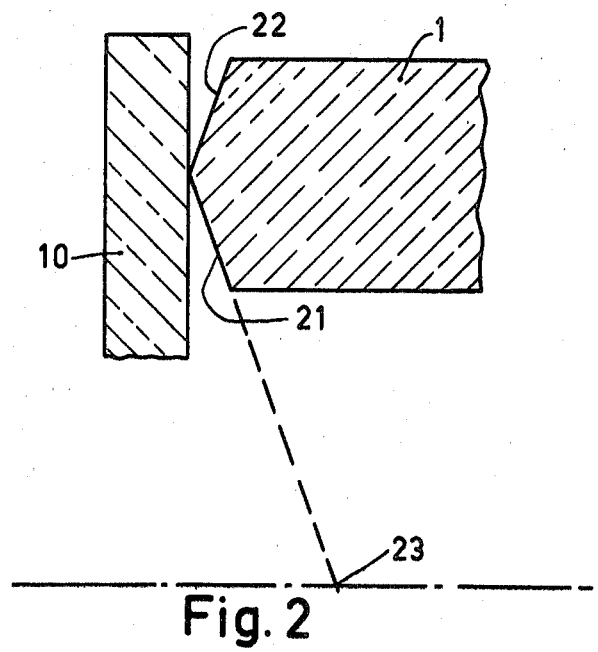

FIG. 2 shows on an enlarged scale how the reflector plate 10 bears on the ground end of tube 1. The two conically ground faces 21 and 22 have half apexes of 70° relative to the axis of the tube 1 denoted by 23.

Figure 3:
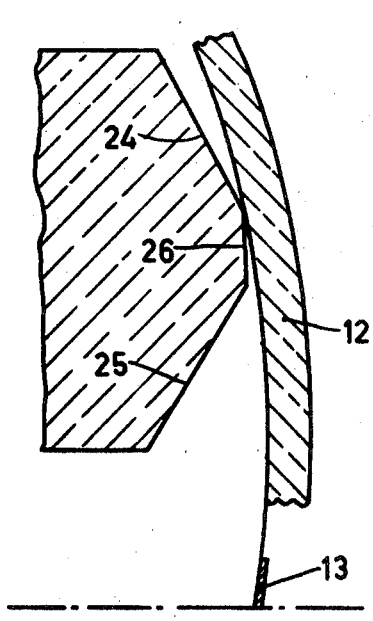

The conical surfaces 24, 25 and 26 in FIG. 3 have half apexes of 60°, 70° and 85°, respectively. The concave reflector plate 12, bears on the line of intersection of the surfaces 24 and 26.

Figure 4:
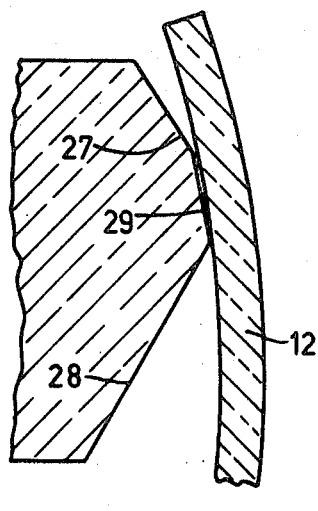

The surfaces 27, 28 and 29 in FIG. 4 have half apexes of 60°, 60° and 80°, respectively. In this case, the reflector plate 12 bears on the line of intersection of the surfaces 28 and 29.

Figure 5:
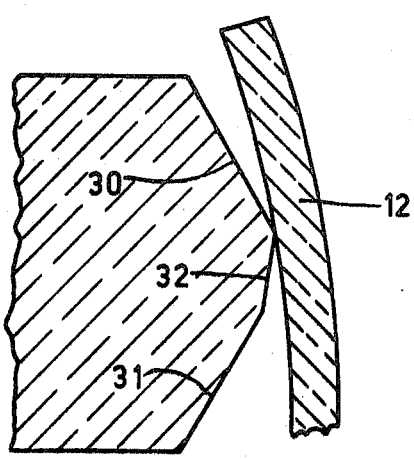

The surfaces 30, 31 and 32 in FIG. 5 have half apexes of 60°, 60° and 80°, respectively. The reflector plate 12 in this case, bears on the line of intersection of the surfaces 30 and 32.

It should appear from FIGS. 2 to 5, that irregularities in the wall thickness, and the centering of the outer tube relative to the centering axis, are of no influence on the line of intersection of the conical surfaces which is obtained. That is to say the perpendicular position thereof relative to the centering axis, and the centering relative to said axis, does not exert an influence thereon.

We claim:

1. A gas discharge laser, comprising:
    a quartz body containing a gas medium for producing a discharge in an interior portion thereof;
    a pair of reflectors, said reflectors each supported by a plate, each respective plate disposed at an opposite end of said quartz body, each end of said quartz body comprising two oppositely directed conical surfaces forming a support for each respective plate;
    electrodes supported on an exterior portion of said quartz body and communicating with said interior portion by means of ducts extending from said exterior into the interior of said quartz body;
    an elongated hollow quartz tube disposed within the interior portions of said quartz body, and respectively supported at each end thereof by said ducts, the hollow of said quartz tube opening into said ducts and communicating with said electrodes; and
    a screen disposed between one end of said quartz tube and one end of said quartz body.

2. A gas discharge laser as claimed in claim 1, wherein the reflectors comprise a flat and a concave reflector plate disposed upon said quartz body to form a nearly hemispherical resonator.

3. A gas discharge laser as claimed in claim 1, wherein the reflector plates are each attached to the quartz body upon a surface thereof formed by a circular line of intersection of the two oppositely directed conical surfaces which are disposed at each end of the quartz body, said surfaces being centered relative to the interior quartz tube, and enclosing an obtuse angle with each other.

4. A gas discharge laser as claimed in claim 3, wherein half an apex of each of the conical surfaces is at least 60°.

5. A gas discharge laser as claimed in claim 3, wherein the ends of the quartz body each have a third conical surface which intersects the two other conical surfaces, and has half an apex which is at least 80°.

* * * * *

PO-1050
(5/69)

UNITED STATES PATENT OFFICE
CERTIFICATE OF CORRECTION

Patent No. 3735281            Dated    May 22, 1973

Inventor(s) GIJSBERTUS BOUWHUIS, PETRUS FRANCISCUS ANTONIUS HAANS and THEODORUS HENDRIKUS PEEK It is certified that error appears in the above-identified patent and that said Letters Patent are hereby corrected as shown below:

On Title Page, section [75] Inventors:

"Bouhuis" should be --Bouwhuis--.

Signed and sealed this 1st day of January 1974.

(SEAL)
Attest:

EDWARD M.FLETCHER,JR.        RENE D. TEGTMEYER
Attesting Officer               Acting Commissioner of Patents